US012567939B2

(12) United States Patent
Zhou et al.

(10) Patent No.: US 12,567,939 B2
(45) Date of Patent: Mar. 3, 2026

(54) RESOLVING TN/NTN SPECTRUM OVERLAP BY ASSIGNMENT OF BANDWIDTH PARTS TO GEOGRAPHIC AREAS

(71) Applicant: Boost SubscriberCo L.L.C, Englewood, CO (US)

(72) Inventors: Jingyi Zhou, Belle Mead, NJ (US); Siddhartha Chenumolu, Broadlands, VA (US); Mehdi Alasti, Reston, VA (US)

(73) Assignee: Boost SubscriberCo L.L.C, Englewood, CO (US)

( * ) Notice: Subject to any disclaimer, the term of this patent is extended or adjusted under 35 U.S.C. 154(b) by 383 days.

(21) Appl. No.: 18/236,273

(22) Filed: Aug. 21, 2023

(65) Prior Publication Data

US 2025/0070951 A1     Feb. 27, 2025

(51) Int. Cl.
  *H04L 5/00*        (2006.01)
  *H04B 7/185*       (2006.01)
  *H04W 72/0453*     (2023.01)

(52) U.S. Cl.
  CPC ....... *H04L 5/0073* (2013.01); *H04B 7/18513* (2013.01); *H04L 5/0048* (2013.01); *H04W 72/0453* (2013.01)

(58) Field of Classification Search
  None
  See application file for complete search history.

(56) References Cited

U.S. PATENT DOCUMENTS

| | | | |
|---|---|---|---|
| 6,463,279 B1 | 10/2002 | Sherman et al. |
| 10,848,237 B1 | 11/2020 | Sorond et al. |
| 10,849,187 B2 | 11/2020 | Tsai et al. |
| 11,588,544 B2 | 2/2023 | Alasti et al. |
| 2015/0063193 A1 | 3/2015 | Veerepalli et al. |

(Continued)

FOREIGN PATENT DOCUMENTS

| | | |
|---|---|---|
| WO | 2021/037327 A1 | 3/2021 |
| WO | 2021/038012 A1 | 3/2021 |

(Continued)

OTHER PUBLICATIONS

International Search Report and Written Opinion received for PCT Patent Application No. PCT/US24/42957, mailed on Dec. 4, 2024, 10 pages.

(Continued)

*Primary Examiner* — Jenkey Van
(74) *Attorney, Agent, or Firm* — Jeremiah J. Baunach; Frontier IP Law PLLC

(57)     ABSTRACT

Methods and systems for operating a Non-Terrestrial Network (NTN) within neighboring geographic areas, and where a Terrestrial Network (TN) is also operating in at least one of the areas. A set of two or more candidate Bandwidth Parts (BWPs) are selected for use by the NTN from spectrum allocated for use by the NTN which does not overlap with the channels used by the TN. The two or more BWPs may each specify a contiguous set of frequencies and timeslots. One of the candidate BWPs is assigned for use by the NTN as an active BWP in a first one of the neighboring (Continued)

geographic areas; and one candidate BWPs is also assigned for use by the UEs as an active BWP in a second one of the neighboring geographic areas.

20 Claims, 11 Drawing Sheets

(56) References Cited

U.S. PATENT DOCUMENTS

| | | | | |
|---|---|---|---|---|
| 2021/0036769 | A1* | 2/2021 | Sorond | H04B 7/18519 |
| 2021/0058145 | A1* | 2/2021 | Alasti | H04W 76/27 |
| 2021/0195488 | A1 | 6/2021 | Zhang et al. | |
| 2022/0052771 | A1 | 2/2022 | Alasti et al. | |
| 2022/0086715 | A1 | 3/2022 | Hong et al. | |
| 2022/0167338 | A1 | 5/2022 | Cao et al. | |
| 2022/0330168 | A1 | 10/2022 | Alasti et al. | |
| 2022/0338159 | A1 | 10/2022 | Phuyal et al. | |
| 2022/0345206 | A1 | 10/2022 | Sorond et al. | |
| 2022/0377780 | A1 | 11/2022 | Khoshkholgh Dashtaki et al. | |
| 2023/0070326 | A1 | 3/2023 | Alasti et al. | |
| 2023/0109920 | A1* | 4/2023 | Zhang | H04L 5/0094 |
| | | | | 375/262 |
| 2023/0111373 | A1 | 4/2023 | Chandran | |
| 2024/0049212 | A1* | 2/2024 | Lee | H04B 7/18513 |
| 2025/0056255 | A1 | 2/2025 | Fu et al. | |
| 2025/0081185 | A1* | 3/2025 | Maaref | H04W 72/23 |

FOREIGN PATENT DOCUMENTS

| | | | |
|---|---|---|---|
| WO | 2022/060172 | A1 | 3/2022 |
| WO | 2022/213233 | A1 | 10/2022 |
| WO | 2022/235271 | A1 | 11/2022 |

OTHER PUBLICATIONS

CMCC: "Discussion on cell reselection", 3GPP Draft; R2-2110265 3rd Generation Partnership Project (3GPP), vol. RAN WG2, No. Electronic, Oct. 22, 2021, XP052066710.

International Search Report and Written Opinion received for PCT Patent Application No. PCT/US24/45927, mailed on Dec. 20, 2024, 12 pages.

3GPP TR 38.863 V0.3.0 "3rd Generation Partnership Project; Technical Specification Group Radio Access Network; Solutions for NR to support non-terrestrial networks (NTN): Non-terrestrial networks (NTN) related RF and co-existence aspects (Release 17)." Mar. 2022. 93 pages.

Martikainen et al., "Coexistence of Terrestrial and Non-Terrestrial Networks on Adjacent Frequency Bands," [https://doi.org/10.22541/au.167226767.78205978/v1], Dec. 28, 2022. 28 pages.

Devopedia. "5G NR Bandwidth Part." [https://devopedia.org/5g-nr-bandwidth-part], Version 5, Mar. 8. Accessed May 2, 2023. 11 pages.

"5g & Non-Terrestrial Networks," A 5G Amerias White Paper, Feb. 2022. 35 pages.

Stuhlfauth, "Non-Terrestrial Network Technology from a 3GPP Perspective," Microwaves & RF, Oct. 18, 2022. 17 pages.

Geraci et al., "Integrating Terrestrial and Non-terrestrial Networks: 3D Opportunities and Challenges," arXiv: 2207.10385 v1, Jul. 21, 2022. 17 pages.

Giordani et al., "Non-Terrestrial Networks in the 6G Era: Challenges and Opportunities," arXiv: 1912.10226 v3, Apr. 26, 2021. 8 pages.

* cited by examiner

FIG. 3

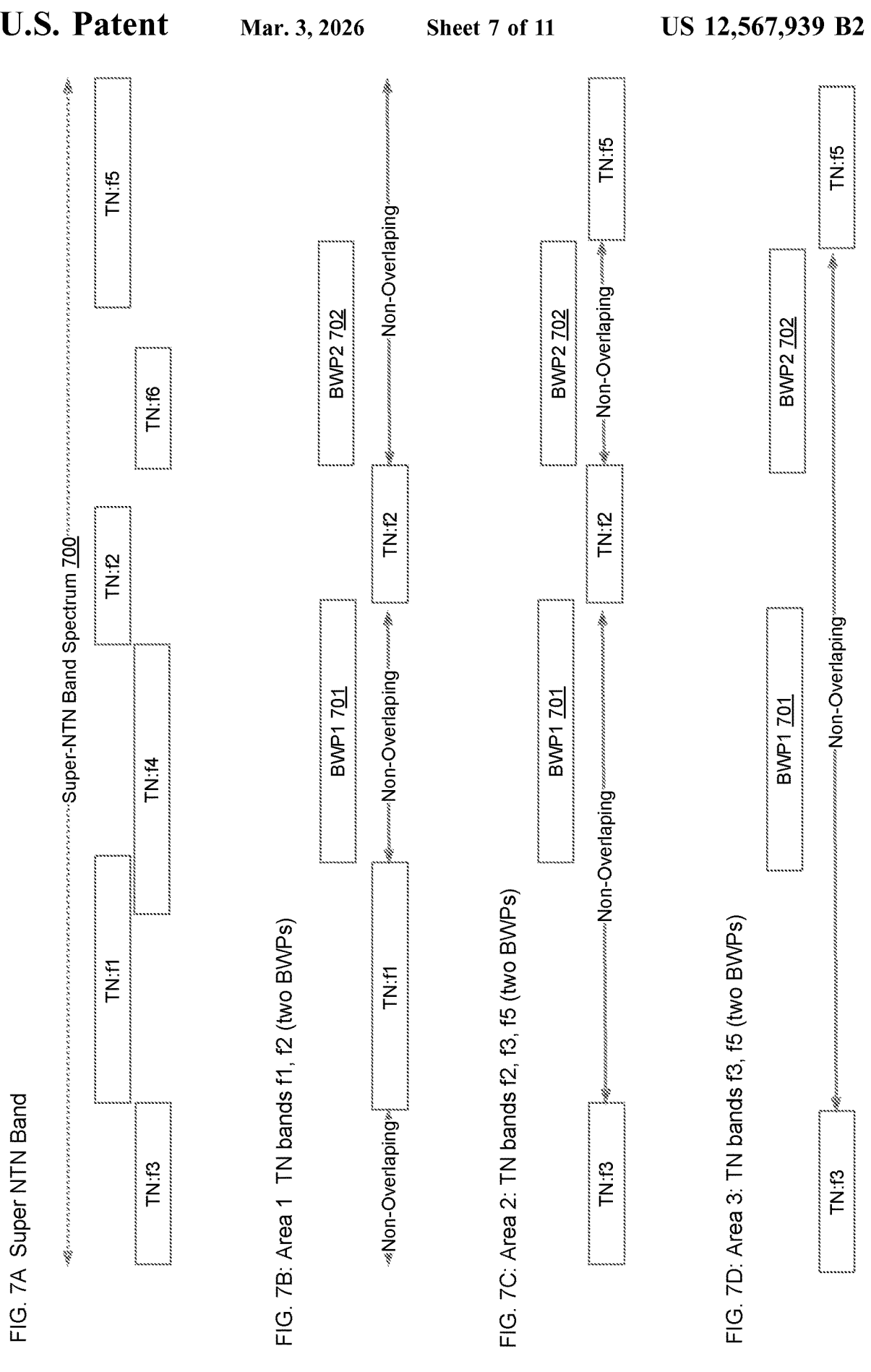
FIG. 7A  Super NTN Band
FIG. 7B: Area 1  TN bands f1, f2 (two BWPs)
FIG. 7C: Area 2: TN bands f2, f3, f5 (two BWPs)
FIG. 7D: Area 3: TN bands f3, f5 (two BWPs)

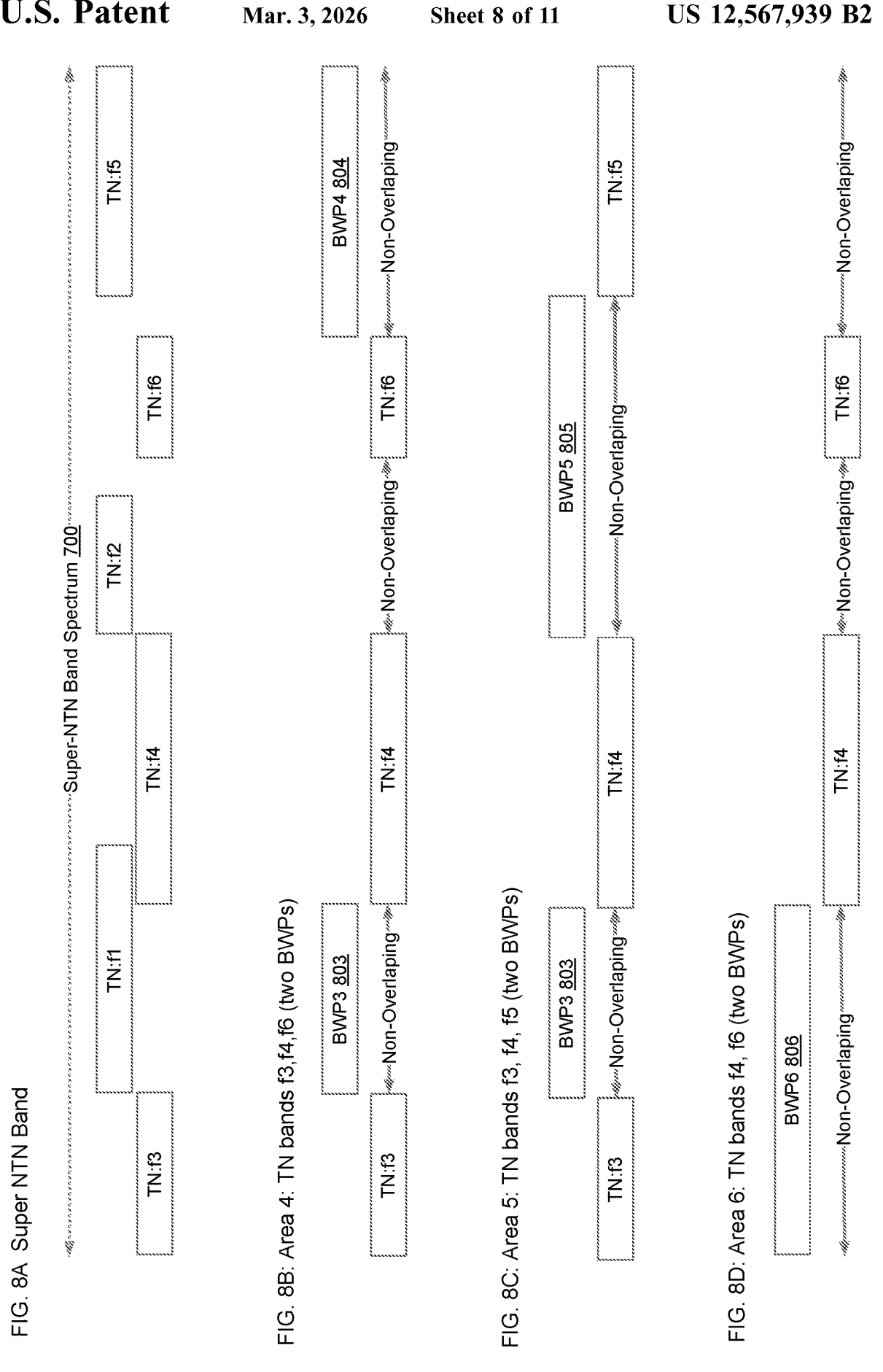
FIG. 8A  Super NTN Band
FIG. 8B: Area 4: TN bands f3,f4,f6 (two BWPs)
FIG. 8C: Area 5: TN bands f3, f4, f5 (two BWPs)
FIG. 8D: Area 6: TN bands f4, f6 (two BWPs)

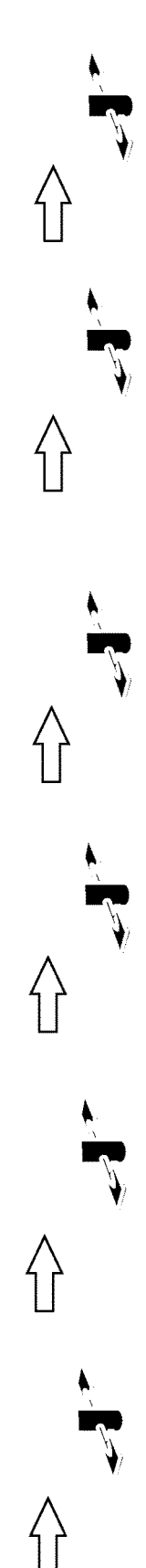

| Area 1 901 | Area 2 902 | Area 3 903 | Area 4 904 | Area 5 905 | Area 6 905 |
|---|---|---|---|---|---|
| NTN: BWPs<br>BWP1, BWP2 | NTN: BWPs<br>BWP1, BWP2 | NTN: BWPs<br>BWP1, BWP2 | NTN: BWPs<br>BWP3, BWP4 | NTN: BWPs<br>BWP3, BWP5 | NTN: BWPs<br>BWP6 |
| UE1 ... UE5<br>TN: f1, f2 | UE6 ... UE9<br>TN: f2,f3,f5 | UE10 ... UE15<br>TN: f3, f5 | UE16 ... UE18<br>TN: f3, f4, f6 | UE19 ... UE21<br>TN: f3, f4, f5 | UE22 ... UE27<br>TN: f4, f6 |
| UE1, UE2, UE3:<br>Active BWP=BWP1<br>Non-Active BWP=BWP2 | UE6,UE7<br>Active BWP=BWP1<br>Non-Active BWP=BWP2 | UE10, UE11, UE12:<br>Active BWP=BWP1<br>Non-Active BWP=BWP2 | UE16, UE17:<br>Active BWP=BWP3<br>Non-Active BWP=BWP4 | UE19, UE20:<br>Active BWP=BWP3<br>Non-Active BWP=BWP5 | UE22, UE23, UE24:<br>UE25, UE26, UE27:<br>Active BWP=BWP6<br>Non-Active BWP: none |
| UE4, UE5:<br>Active BWP=BWP2<br>Non-Active BWP=BWP1 | UE8, UE9:<br>Active BWP=BWP2<br>Non-Active BWP=BWP1 | UE13, UE14:<br>Active BWP=BWP2<br>Non-Active BWP=BWP1 | UE18:<br>Active BWP=BWP4<br>Non-Active BWP=BWP3 | UE4, UE5:<br>Active BWP=BWP5<br>Non-Active BWP=BWP3 | |

FIG. 9

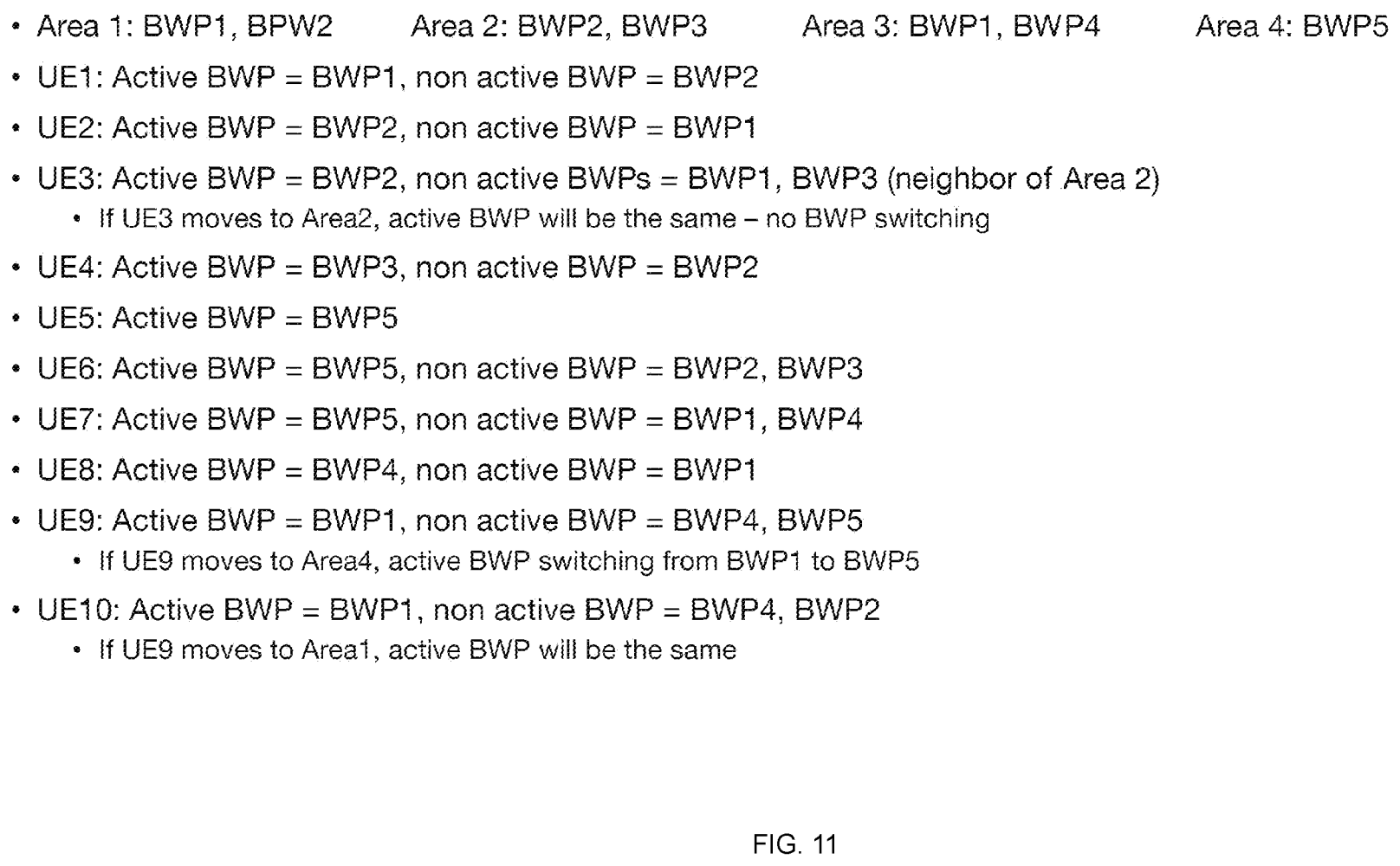

- Area 1: BWP1, BPW2     Area 2: BWP2, BWP3     Area 3: BWP1, BWP4     Area 4: BWP5

- UE1: Active BWP = BWP1, non active BWP = BWP2

- UE2: Active BWP = BWP2, non active BWP = BWP1

- UE3: Active BWP = BWP2, non active BWPs = BWP1, BWP3 (neighbor of Area 2)
  - If UE3 moves to Area2, active BWP will be the same – no BWP switching

- UE4: Active BWP = BWP3, non active BWP = BWP2

- UE5: Active BWP = BWP5

- UE6: Active BWP = BWP5, non active BWP = BWP2, BWP3

- UE7: Active BWP = BWP5, non active BWP = BWP1, BWP4

- UE8: Active BWP = BWP4, non active BWP = BWP1

- UE9: Active BWP = BWP1, non active BWP = BWP4, BWP5
  - If UE9 moves to Area4, active BWP switching from BWP1 to BWP5

- UE10: Active BWP = BWP1, non active BWP = BWP4, BWP2
  - If UE9 moves to Area1, active BWP will be the same

FIG. 11

RESOLVING TN/NTN SPECTRUM OVERLAP BY ASSIGNMENT OF BANDWIDTH PARTS TO GEOGRAPHIC AREAS

TECHNICAL FIELD

This patent relates to mobile wireless communication systems, and more particularly to techniques that resolve conflicts between spectrum utilization of terrestrial networks and non-terrestrial networks.

BACKGROUND

The Third Generation Partnership Project (3GPP) Fifth Generation (5G) Working Group has specified a broad range of wireless services delivered across multiple access platforms and multi-layered networks to support a variety of end uses. 5G utilizes an intelligent Radio Access Network (RAN) architecture that is not constrained by the location of base stations or complex network infrastructure.

Non-Terrestrial Networks (NTN) are networks or segments of networks that use airborne or spaceborne platforms to deliver wireless connectivity. This technology can potentially revolutionize many industries, from agriculture to shipping, by providing reliable, high-speed wireless to previously unreachable areas.

Recent releases of the 3GPP's 5G standards recognize NTNs as a part of the 5G network infrastructure. Airborne or spaceborne 5G base stations can be launched and connected to terrestrial ground stations in a commercially feasible way. These high-altitude network segments maximize the inherent value of 5G networks by solving coverage problems and complex use cases that ground-based infrastructure alone cannot.

3GPP Release-17 first recognized the need for adjacent band coexistence between 5G New Radio (NR) Terrestrial Networks (TNs) and NR Non-Terrestrial Networks (NTNs). To that end, Release 17 introduced so-called Mobile Satellite Service (MSS) frequency bands to provide connectivity between 3GPP User Equipment (UE) directly with satellites, and which considers that their coexistence in adjacent bands with ground-based Terrestrial Networks (TNs) should be anticipated.

SUMMARY OF PREFERRED EMBODIMENT(S)

In some aspects, the techniques described herein relate to a method or apparatus for operating a Non-Terrestrial Network (NTN) to cover two or more neighboring geographic areas and where a Terrestrial Network (TN) is also operating in at least one of the neighboring areas. The methods and apparatus described herein facilitate operation of NTNs and TNs and provides a solution for adjacent band coexistence and also avoids overlapping spectrum utilization.

A set of two or more candidate Bandwidth Parts (BWPs) are selected for use by the NTN from areas of the electromagnetic spectrum allocated for use by the NTN and which do not overlap with the active channels in use by the TN. The two or more BWPs may each specify a contiguous set of frequencies available for communication between the NTN and User Equipment (UEs) operating within the areas.

One of the candidate BWPs is assigned for use by the NTN as an active BWP in a first one of the neighboring geographic areas, and one candidate BWP is also assigned for use by the UEs as an active BWP in a second one of the neighboring geographic areas.

In some aspects, one or more of the candidate BWPs may be used as one or more non-active BWPs in the first one of the neighboring geographic areas, such that at least one of the non-active BWPs is the same as the active BWP assigned to the second one of the neighboring geographic areas.

When movement of a selected one of the UEs from the first geographic area to the second geographic area is detected, the network may switch the UE's assigned active BWP using information in a Layer 1 Downlink Control Information (DCI) message or through higher layer RRC signaling.

The active BWPs may be further assigned to (a) maximize at least one of throughput, channel quality, or signal strength of the NTN; (b) minimize out-of-band interference between the TN and NTN, and/or (c) minimize intra-NTN-band handover interference when one of UEs moves from one geographic area to another geographic area.

The candidate BWPs for assigned use as the active BWP(s) may also be selected by i.) mapping two or more of the UEs to the one of the set of candidate BWPs having the largest bandwidth, or by ii.) distributing two or more of the set of candidate BWPs to two or more of the UEs, based on the respective bandwidths of the two or more of the set of candidate BWPs.

When a selected UE is located near a border of the first one of the neighboring geographic areas, the active BWPs of the second one of the neighboring areas may be assigned from a non-active list of the selected UE.

When a selected UE is moving from the first neighboring geographic area to the second neighboring geographic area, and the active BWPs of the first and second neighboring geographic areas are the same, then there is no need to switch the selected UE to a new active BWP. Otherwise, switching the selected UE to a new active BWP can involve choosing one of the non-active BWPs already assigned to the UE.

In some implementations, the NTN is operated by a non-geostationary satellite that moves along a projected path from the first neighboring geographic area to the second neighboring geographic area. In this case, the candidate BWPs may be selected from parts of the electromagnetic spectrum that do not overlap with the active channels in use by the TN in either the first neighboring geographic area or the second neighboring geographic area.

The coverage area of the NTN may have a different shape or different dimension than the coverage area of the TN.

The BWPs may be assigned from a super-NTN spectrum that includes contiguous and/or non-contiguous parts of the electromagnetic spectrum allocated for both the TN and NTN in the at least one of the neighboring geographic areas.

In some aspects, the techniques described herein relate to an apparatus for operating a Non-Terrestrial Network (NTN) to cover two or more neighboring geographic areas, and where a Terrestrial Network (TN) is also operating in at least one of the neighboring areas. Such an apparatus may include one or more data processors; and one or more computer-readable media, including instructions that, when executed by the one or more data processors, cause the one or more data processors to perform a process.

The process may include determining active channels in use by the TN, determining a set of two or more candidate Bandwidth Parts (BWPs) for use by the NTN from areas of the electromagnetic spectrum that are allocated for use by the NTN, and which electromagnetic spectrum does not overlap with the active channels in use by the TN, the two or more BWPs each specifying a contiguous set of frequencies available for communication between the NTN and two or more User Equipments (UEs) operating within the two or more neighboring geographic areas; assigning one of the set of candidate BWPs for use by the NTN as an active BWP for the UEs to communicate using the NTN in a first one of the neighboring geographic areas; and assigning one of the set candidate BWPs for use by the UEs as an active BWP for the UEs to communicate using the NTN in a second one of the neighboring geographic areas.

BRIEF DESCRIPTION OF THE DRAWINGS

Features and advantages of the approaches discussed herein are evident from the text that follows and the accompanying drawings, where:

FIG. 3 illustrates a similar situation for NTN channel n255 within the L-band uplink from 1626.5-1660.5 MHz and downlink from 1525-1559 MHz.

FIG. 7A shows a Super NTN spectrum 700 containing six channels assigned to the TN 100.

FIG. 7B shows a first coverage area where TN channel f1 and f2 are active.

FIG. 7C shows a second coverage area with three active TN channels.

FIG. 7D shows that for a third area, two TN channels are active.

FIG. 8A repeats the Super NTN band assignment that was shown in FIG. 7A.

FIG. 8B shows a fourth area where three TN channels may be active.

FIG. 8C shows a fifth area where three other TN channels may be active, leaving non-overlapping BWP3 and BWP5.

FIG. 8D shows a sixth area where two TN channels may be active, so that only BWP6 is available for the NTN.

FIG. 9 illustrates how the set of active BWPs may change as an NTN satellite moves with respect to the ground.

FIG. 11 is a table that lists assignments of BWPs to areas.

DETAILED DESCRIPTION OF PREFERRED EMBODIMENT(S)

Figure 1:
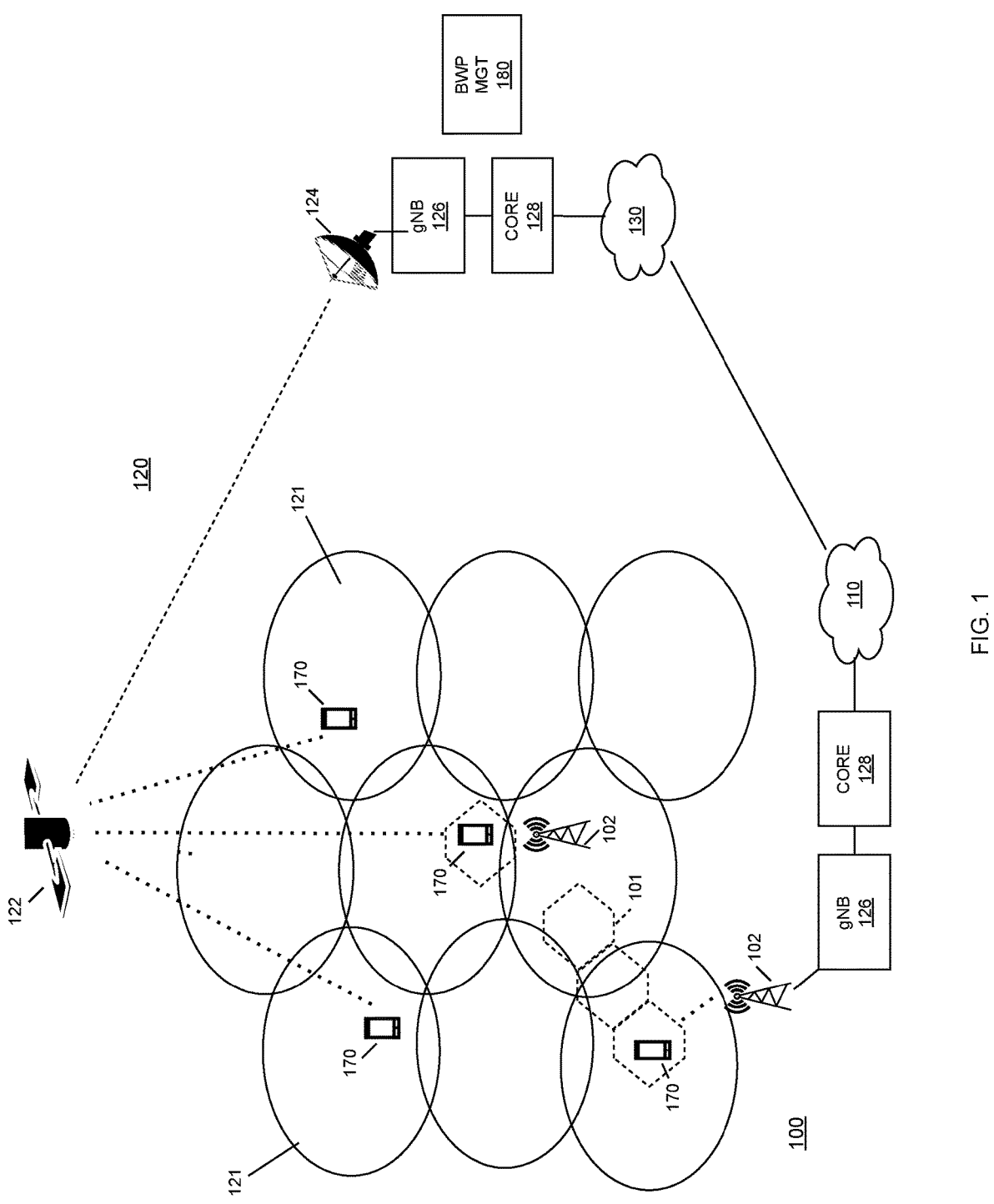
FIG. 1 shows an example scenario where a Terrestrial Network (TN) 100 and a Non-Terrestrial Network (TN) 120 are operating simultaneously in a given geographic area to provide wireless service to User Equipments (UEs) 170.

FIG. 1 shows an example scenario where a Terrestrial Network (TN) 100 and a Non-Terrestrial Network (TN) 120 are operating simultaneously in a given geographic area to provide wireless service to User Equipments (UEs) 170.

The TN 100 can refer specifically to a New Radio (NR) implementation as specified by the Third Generation Partnership Project (3GPP) Fifth Generation (5G) Working Group. The TN 100 uses terrestrial antennas 102 and a 5G Radio Access Nodes (RAN) 105 including a 3GPP Next Generation Node B (gNB) 106 to service UEs 170 located in a cell or coverage area 101. 5G core functions 108 provide connectivity between the UEs 170 and a data network 110.

Data network 110 can represent one or more public and/or private networks. For example, data network 110 can include the Internet. However, data network 110 may also include a private communication network of a communications service provider.

The NTN 120 services UEs 170 via a space-borne platform such as a Low Earth Orbiting (LEO) satellite 122. The NTN 120 may be enabled by other types of platforms such as Medium Earth Orbit (MEO) and Geostationary Earth Orbit (GEO) satellites, and can also include High Altitude Platform Systems (HAPS) and other airborne or space-borne systems.

The NTN 120 can refer specifically to a 5G New Radio (NR) implementation. In such an embodiment, the NTN 120 implements a 5G Radio Access Node 125, including an NTN gateway 124 and gNB 126. The NTN 120 also includes a 5G core 128 to provide connectivity to a data network 130. Data network 130 can represent one or more public and/or private networks. Data networks 110 and 130 may be the same network, or they may each include one or more interconnected data networks.

The gNB 106, 126 and 5G core 108, 128 components can be controlled together or independently and can be deployed on either physical data processing machines (e.g. as small cell hardware) or as virtual machines running on dedicated servers, as shared cloud resources, or some combination thereof.

One aspect of the control of the gNB 126 and core 128 of the NTN 120 is Bandwidth Part (BWP) Management 180. Particular functions of BWP Management 180 will be discussed in more detail below. BWP Management 180 can be deployed on either physical data processing machines (e.g. as small cell hardware) or as virtual machines running on dedicated servers, as shared cloud resources, or some combination thereof.

The UEs 170 represent various forms of mobile wireless devices that can communicate using the TN 100 and/or NTN 120. For example, any combination of mobile phones, smartphones, cellular modems, personal computers, wireless sensors, access points (APs), gaming devices, Internet of Things (IoT) devices, and any other 5G-equipped device may function as UEs 170.

FIG. 1 shows specific logical nodes as singular elements, but in many instances, each logical node is provided for or connected in plural. For example, the NTN 120 may include several satellite platforms 122, and the TN 100 may include a number of terrestrial stations 102. In a typical system, thousands of UEs 170 may be present in a particular area. Thus any given TN 100 or NTN 120 may be communicating with many UEs 170. There also may be a mix of UEs 170 that can communicate with only a TN 100 or only with an NTN 120; however, some UES may be capable of communicating with both the TN 100 and NTN 120.

In a scenario of interest, the NTN 120 operates within electromagnetic spectrum according to a regulation or specification. As one example, 3GPP TR 38.863 specifically contemplates the co-existence of 5G NR Non-Terrestrial Networks (NTNs) with overlaid Terrestrial Networks (TNs) for providing Mobile Satellite Service (MSS). Depending on the International Telecommunications Union (ITU) regulations specific to a particular geographic region, there can be partial or even complete overlap between the bands assigned to the TNs 100 and the bands assigned to the NTNs 120.

Figure 2:
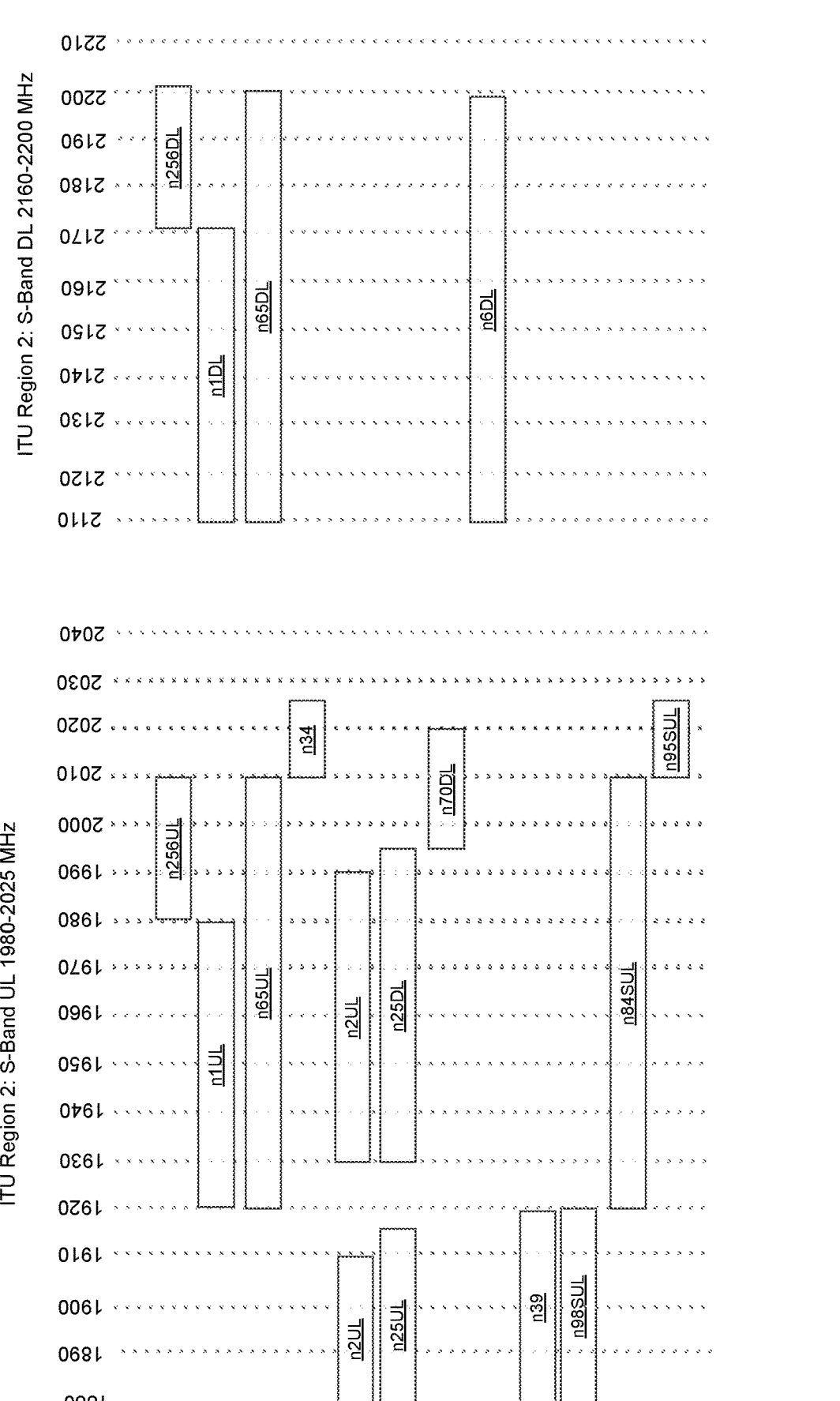
FIG. 2 illustrates an example of the TN 100 and NTN 120 spectrum allocations for ITU Region 2.

FIG. 2 illustrates an example of the TN 100 and NTN 120 spectrum allocations for ITU Region 2. The NTN channel labeled "n256" is allocated for uplink (UL) in the S-band from 1980-2010 MHz, and n256 is also allocated for downlink (DL) within the S-Band from 2170-2200 MHz. Note that there are several possibly active TN channels (n1, n65, etc.) near, and some of these overlap the NTN channels. Also note within the UL band that NTN channel n256 is fully overlapped by TN n65 UL and partly overlapped by TN n2 DL, n25 DL, and n70 DL. For the downlink direction, the n256 NTN channel is fully overlapped by TN n65 and n66 and partially overlapped by TN DL n1.

This limits NTN n256 deployment to regions where TN n2, n25, n65, n66, and/or n70 are not deployed. However, deployment of NTN n256 is possible where other non-overlapping TN bands such as n25, n39, n84, and n98 are active. Note also that the NTN n256 UL channel is adjacent to, but not overlapping, TN n1 (FDD) and n34 (TDD). These additional TN channels can be active if they are protected from NTN interference.

Figure 3:
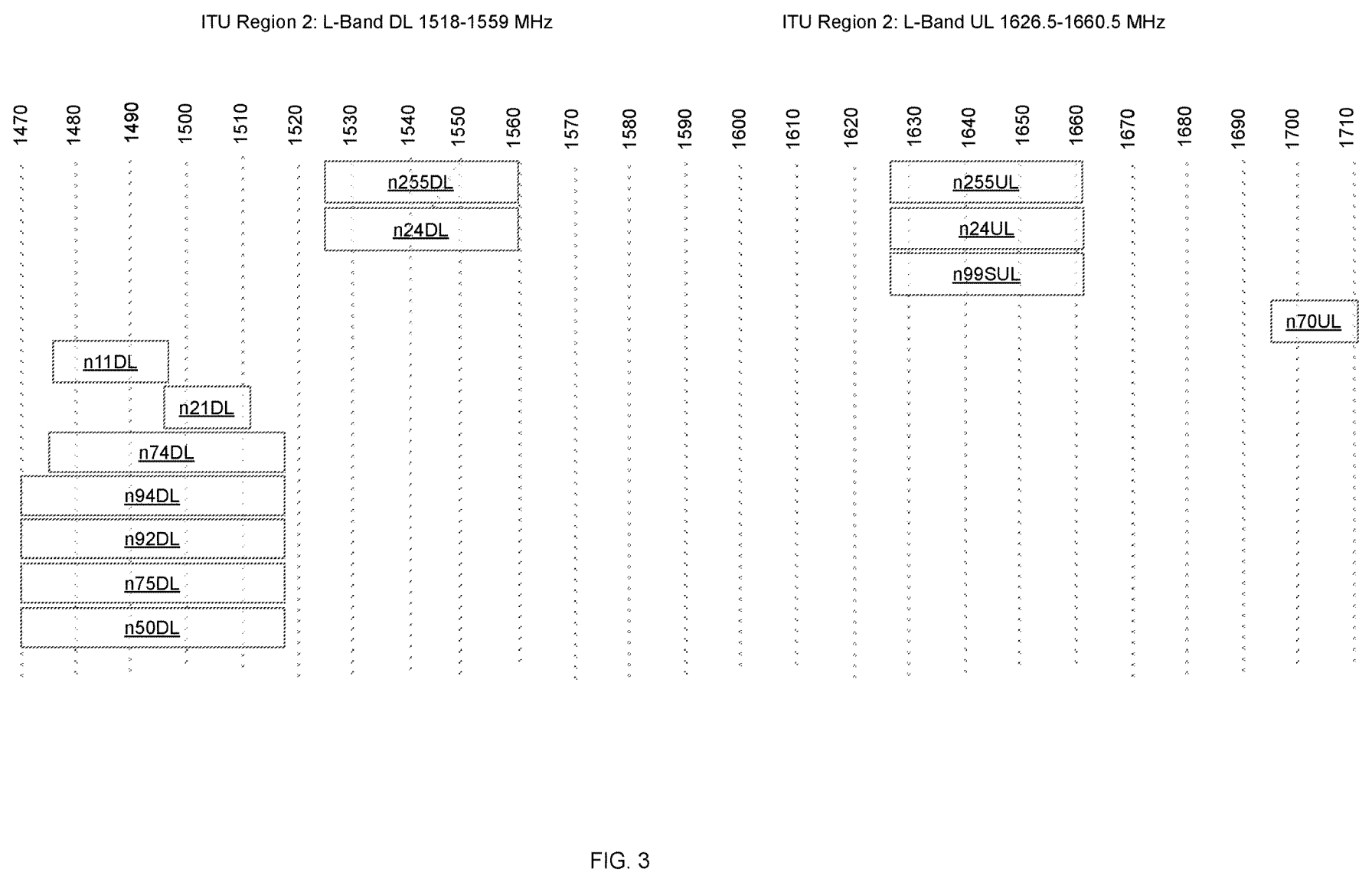

FIG. 3 illustrates a similar situation for NTN channel n255 within the L-band UL from 1626.5-1660.5 MHz and DL from 1525-1559 MHz. Here, NTN n255 is fully overlapped by TN NR n24 on the downlink. On the uplink, NTN n255 is overlapped by TN NR bands n24 and n99. Also, the NTN band n255 fully overlaps with TN NR bands n24 and n99.

Therefore, it is possible for NTN and TN networks to overlap and operate within the same area simultaneously. However, this requires active channel assignments to be coordinated based on these regulatory constraints.

The problem of the NTN channels overlapping with TN channels can be solved by coordinated assignment and switching of the Bandwidth Parts (BWPs) allocated for use by the NTN 120 as the UEs 170 and/or satellite stations 122 move between geographic areas.

More particularly, a channel allocated for communication within the NTN may be subdivided into multiple Bandwidth Parts (BWPs). A BWP, as defined by 3PP in the 3GPP 5G standard, is an allocation of a contiguous set of resources, such as frequencies and timeslots, available for communication between UEs 170 and a base station (e.g., a gNB 126). A gNB 126 and UE 170 only communicate within a BWP that is active for that particular UE 170.

The BWPs used for communication within the NTN 120 should therefore be readily adjustable and adaptable. In present-day 5G implementations, each UE 170 can be assigned up to four BWPs in each direction (uplink and downlink), but only one BWP can be active for a UE in each direction at a given time. Information regarding the other three assigned BWPs in each direction should be retained on non-active list.

BWP Management 180 may thus coordinate the use of a specific section of the spectrum between the NTN 120 and TN 100. Returning attention briefly to FIG. 1, BWP Management 180 may accomplish this by ensuring that a given UE 170 maintains lists of active BWPs and non-active BWPs in a particular way. This may be implemented by transmitting active BWP information from BWP Management 180 to the gNB 126 and then from the gNB 126 to the UE 170 either through Layer 1 Downlink Control Information (DCI) messaging (so-called fast switching) or through higher layer Radio Resource Control (RRC) messaging (which is slower). DCI and RRC messaging may also be used to update a UE's non-active list.

The functionality of BWP Management 180 may be incorporated partially or wholly within or coordinated by 5G core 128 or at one or more components of the RAN 125, such as the gNB 106. BWP Management 180 may also communicate via network 130 and/or 110 to coordinate BWPs assignments so that it is aware of the channels currently active with the TNs 100 operating in the same or neighboring areas as the NTN 120.

In the systems described herein, the satellite stations implementing the NTN 120 may utilize directional beamforming antennas. As shown in FIG. 1, a beamforming antenna, in effect operates as a set of small antennas, each serving a particular geographic area 121 independently of other areas. In this example, nine (9) beams each serve a respective geographic area 121. Each generated beam can also operate within its assigned NTN channel(s) and within its assigned BWPs.

The NTN 120 can use the beamforming antenna array to transmit and receive signals only over the non-overlapping spectrum dedicated to the NTN (e.g., its assigned Active BWPs). As a result, the NTN signals originating from other UEs in the other geographical areas will be rejected by the beamforming antenna array. This approach also allows the satellite to coordinate the use of the best available non-overlapping BWPs depending on the other active BWPs in adjacent areas.

Note here that the area 121, served by a given NTN beam are not necessarily the same size or shape as the cells 101 serviced by a given terrestrial antenna 102 or TN 100. Also germane here is that when a NTN antenna beam is present in an area 121 where there is overlap with a TN channel, the NTN 121 is configured to only broadcast using BWPs that are located within bands where there is no overlap with the overlaid TN cell 101.

It should also be understood that a given beamforming antenna on satellite 122 may be shared between wireless service providers. For example, one set of beams and BWPs may be dedicated to a first operator, such as a Mobile Network Operator (MNO) such as Verizon; another set of beams and BWPs assigned to a Virtual MNO, such as Dish, and a third set of beams and BWPs assigned to support a private wireless operator such as General Motors.

Figures 4A, 4B:
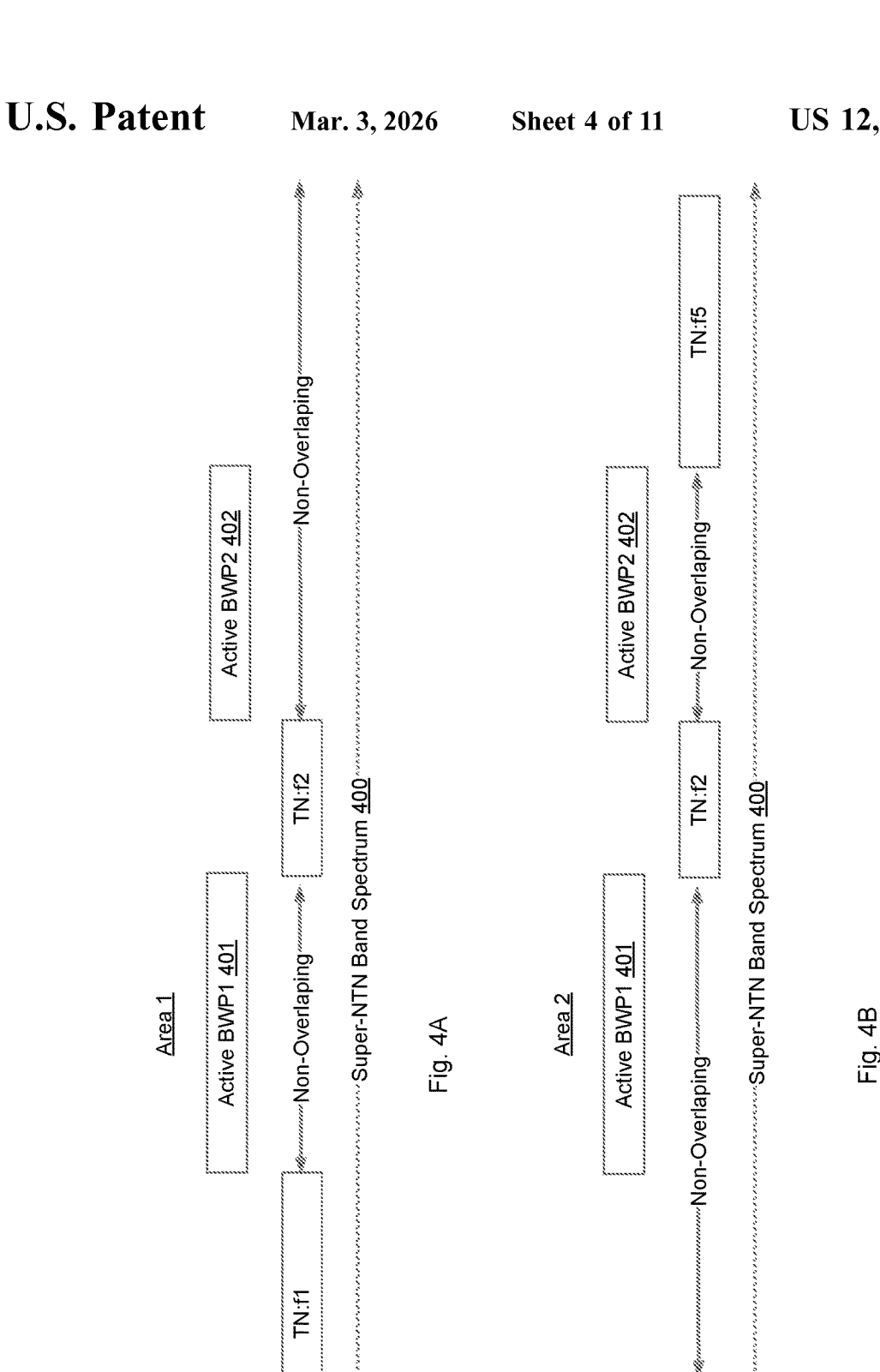
FIGS. 4A and 4B illustrate how BWP Management 180 may allocate spectrum among an NTN 120 and a TN 100.

FIGS. 4A and 4B illustrate how BWP Management 180 may allocate spectrum among an NTN 120 and a TN 100 to ensure that the NTN 120 is configured to only use BWPs that are located within spectrum bands where there is no overlap with an active TN. This can be implemented by defining a "Super" NTN band 400 as a collection of contiguous or and/or non-contiguous spectrum. In one example, this Super NTN band can include the NR n256 channel that 3GPP assigns for NTN as well as a larger portion of the ITU S-band that includes TN channels. This larger portion of the S-band will be used for the TN channels. The exact extent of the Super NTN band 400 may depend on which portions of the S-band are permitted for use in the ITU region of interest.

In this example, the TNs in "Area 1" are assigned to use the channels labeled "f1" and "f2". Channels f1 and f2 may be selected from the TN channels that are available to be used in the geographic area being covered. These may be the TN channels defined by the ITU S-band plan for the region (recall that FIGS. 2 and 3 illustrated some example TN channels for ITU Region 2). Here a first non-overlapping NTN band exists between f1 and f2 and can be assigned as the first active BWP we will refer to as active BWP1 401. A second non-overlapping band sits above f2 and will be assigned as active BWP2 402.

Also, in this example, the TNs in an adjacent geographic area, "Area 2", use the "f2", "f3", and "f5" channels, as shown in FIG. 4B. The non-overlapping spectrum between these TNs channels can be respectively for Area 2 as Active BWP1 411 and Active BWP2 412. In this example, the Active BWPs in these two different geographical areas (e.g., Area 1 and Area 2) happen to encompass the same spectrum. However, these need not be the same in other arrangements.

Note also that the shape, size, and alignment of the cells operated by the TN 100 are likely different from the shape, size, and alignment of the beams operated by the NTN 120. For example, coverage of a TN may typically be a market, such as city and the suburban areas around it. A market usually includes a collection of TN cells. On the other hand, an NTN beam may cover a very large area that could be even larger than a single TN market. However in other scanarios, an NTN beam may only cover a part of a very large TN market. Therefore the areas of "non-overlapping spectrum" between overlaid TN 100 and NTN 120 may not precisely follow the defined coverage areas of either one network or the other.

Figure 5:
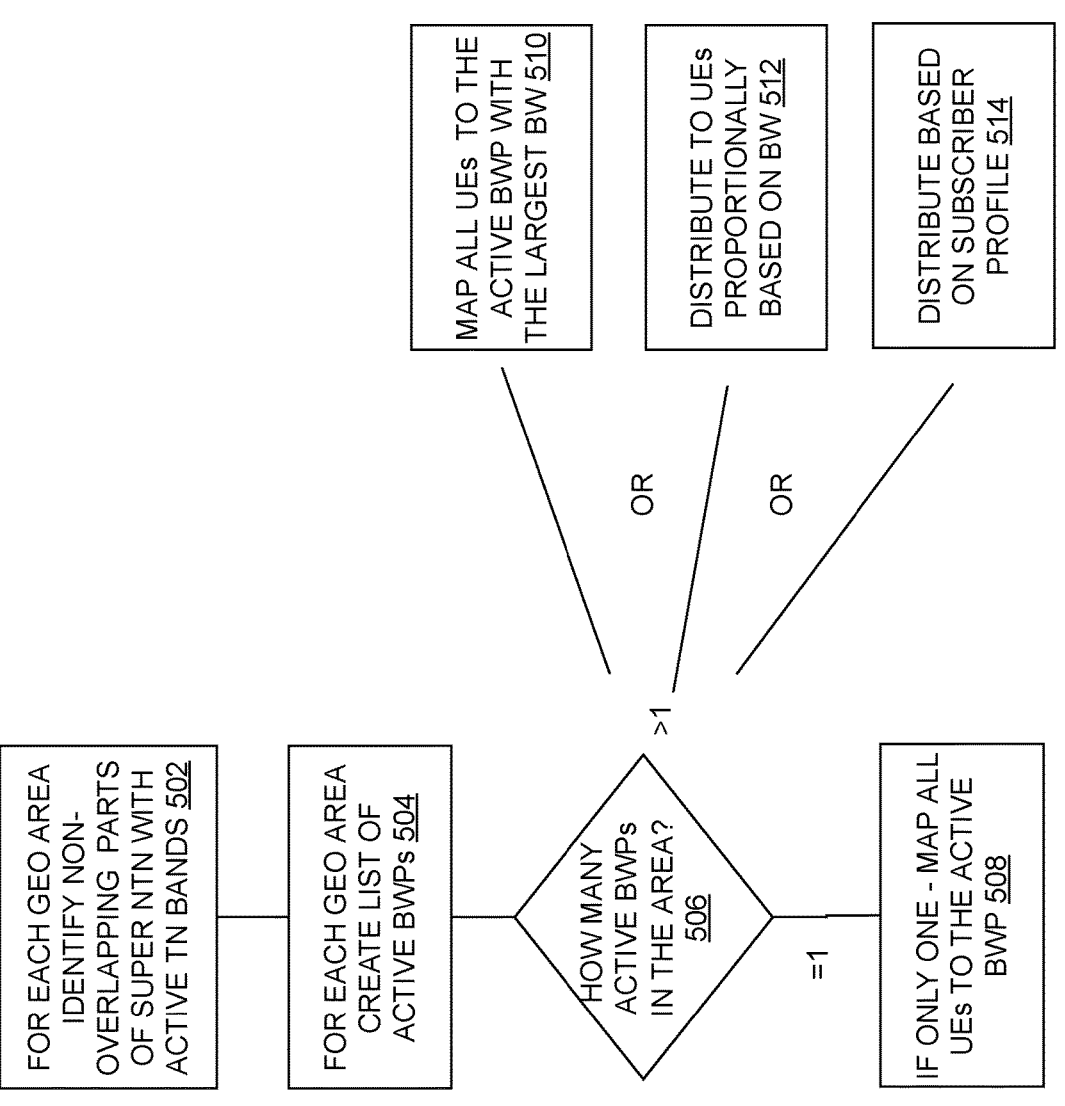
FIG. 5 is an example flowchart of the steps that may be carried out by BWP Management 180.

FIG. 5 is an example flowchart of the steps that may be carried out by BWP Management 180.

First, in state 502, a Super NTN band is defined as a collection of contiguous and/or non-contiguous spectrum.

Next, in state 504, a list of active BWPs is created for each area serviced by the NTN 120. These active BWPs that do not overlap with the channels allocated for the TN 100 are determined, as was explained in FIGS. 4A and 4B. For example, these active BWPs are allocated from at least some part of the Super-NTN-Band that has no overlap with the active TN channels in each area.

As part of state 504, BWP Management 180 may choose only those BWPs which meet one or more criteria, such as (a) maximizing NTN performance (throughput, channel quality or signal strength, etc.), (b) minimizing TN-NTN out-of-band interference, and/or (c) minimizing intra-NTN-band handover for the UEs crossing one area to another area.

The non-overlapping BWPs that do not provide acceptable performance for NTN communication are thus removed from possible candidate BWPs.

In state 506, for each area, a list of potential active BWPs is created based on the non-overlapping frequency bands. This may depend on how many BWPs are available to be active in the area.

For example, in state 508, if there is only one possible active BWP in the area, then all of the UEs in that area will be mapped to that same active BWP.

However, if there are multiple possible active BWPs in that area, then different algorithms can be used to distribute the BWPs to the UEs. These can include:

i. mapping all UEs to the active BWP with the largest bandwidth (state 510); or ii. Distributing BWPs to Ues proportionally, based on the respective bandwidths of the available BWPs.

For example, if there are two possible BWPs of 10 MHz and 5 MHz, then ⅔rds of the Ues are mapped to the 10 MHz BWP, and the remaining ⅓$^{rd}$ are mapped to the 5 MHz BWP (state 512); or iii. Distributing the BWPs to Ues based on a profile of the UEs. For example, certain UEs may have paid for a premium service that offers greater throughput than other UEs (state 514).

Figure 6:
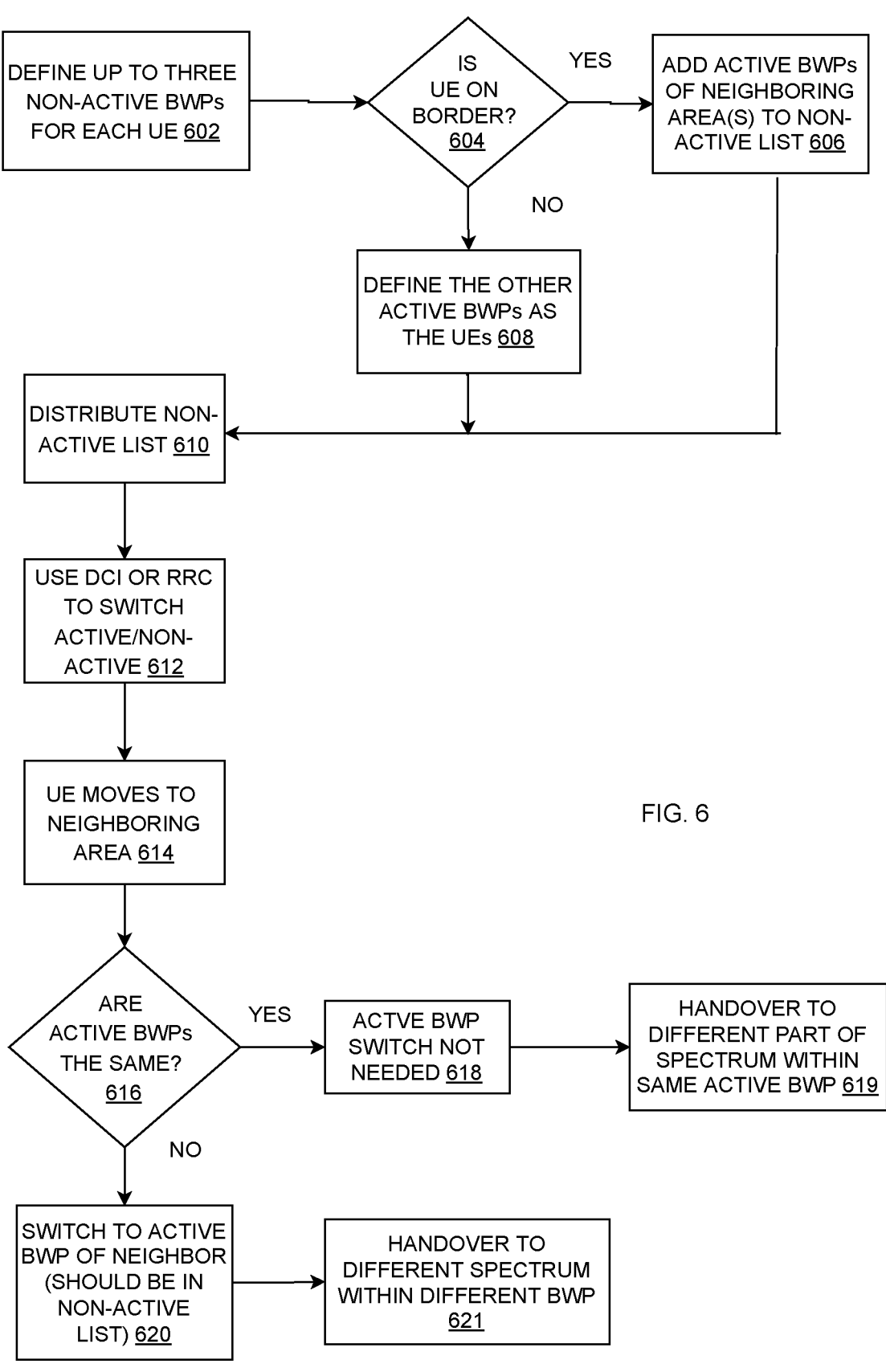
FIG. 6 is an example flow for BWP Management 180 to select non-active BWPs such that BWP switching utilizes DCI messaging when possible.

FIG. 6 is an example flow for BWP Management 180 and/or BWP Management operating with gNBs to select non-active BWPs such that BWP switching utilizes the quicker DCI messaging method when possible. This may be accomplished by ensuring that the non-active BWP list for each UE contains the active BWPs for neighboring areas to the extent possible. If so, when the UE moves to the neighboring area, then the faster DCI switching scheme can be used to simply instruct the UE to switch to a BWP that it already has on its non-active list.

More particularly, in state 602, up to three non-active BWPs may be assigned to each UE. This assignment can depend on the location of the UE. Thus the BWP Management 180 should be informed of the location of UEs (such as via the gNB 126) so that it can configure each UE's non-active BWPs accordingly.

Thus in state 604, it is determined whether the UE is on the border of the current area.

If so, then in state 606, the active BWPs of the neighboring area are added to the UE's non-active list. This will assist with later BWP switching if the UE moves into the neighboring area.

If, however the UE is not near a border, then in state 608, other BWPs assigned to the area can be added to the non-active list.

In state 610, the non-active BWP list for the UE is distributed from the BWP Management 180 to the gNB 226.

Next, in state 612, the non-active list is forwarded to the UEs. This can be by RRC messaging sent from the gNB to the UEs.

At some point, in state 614, the UE moves to a neighboring area. Therefore active BWP switching may or may not be needed. Thus a test is performed in state 616 to determine if the active BWPs of the two neighboring areas are the same.

If the active BWPs of the neighboring areas are identical, then in state 618, switching of the active BWP is not required. Note however, that in state 619, the UE may need to effect an intra-frequency handover and change to operate over a different part of the spectrum within the same active BWP. This avoids possible interference between adjacent areas that have been assigned the same BWP.

However, if the active BWPs of the neighboring areas are not the same, then in state 620 the active BWP of the neighboring area should be found in the UE's list of non-active BWPs. In this instance, as an NTN UE moves to another area with a different active BWP in state 621, it may need to effect an inter-frequency handover and operate on a different frequency within a different BWP.

Consideration should also be given to the fact that certain satellites 122 are Non-Geostationary Orbit (NGSO) satellites that move across the sky over time. Therefore the geographic areas served by their several beams and even the ITU regions serviced will also change over time. As a result, the assigned BWPs should also change to accommodate such satellite movement.

To further illustrate this situation, FIGS. 7A, 7B, 7C, 7D and 8A, 8B, 8C, and 8D illustrate an example Super NTN band and how the corresponding non-overlapping BWPs might be distributed to six different coverage areas.

FIG. 7A shows an example Super NTN spectrum 700 containing six channels assigned to the TN 100, namely f1, f2, f3, f4, f5, and f6. Each such channel may have a different bandwidth than other TN channels.

FIG. 7B shows that within a first coverage area, area 1, TN channels f1 and f2 are active. Two active bandwidth parts, BWP1 701 and BWP2 702, are defined for use in the non-overlapping spectrum. One such part (BWP1 701) is located between f1 and f2, and the other part (BWP2 702) is located above f2.

FIG. 7C shows that for a second coverage area, area 2, there are three active TN channels—f2, f3, and f5. Two BWPs are also active in this area, BWP1 701 and BWP2 702. These happen to be identical to the BWPs that are assigned to area 1. However, it should be understood that in another arrangement, these BWPs assigned to area 2 might differ from those assigned to area 1.

FIG. 7D shows that for area 3, TN channels f3 and f5 are active. BWP1 and BWP2 assigned to area 3 are the same as for area 1 and area 2.

For convenience, FIG. 8A repeats the Super NTN band assignment that was shown in FIG. 7A.

FIG. 8B shows that for area 4, TN channels f3, f4, and f6 may be active. Thus two non-overlapping areas can be assigned as BWP3 803 and BWP4 804.

FIG. 8C shows that for area 5, TN channels f3, f4, and f5 may be active, leaving non-overlapping BWP3 803 and BWP5 805.

FIG. 8D shows that for area 6, TN channels f4 and f6 may be active so that only BWP6 806 is available for the NTN.

FIG. 9 illustrates this same scenario but can be used by BWP Management 180 to plan in advance how the set of active BWPs should change as the satellite covers different areas and even ITU regions as it moves with respect to the ground.

In an initial state 901, the satellite 122 is servicing NTN area 1. Two BWPs, including BWP1 and BWP2, are assigned to be used by the NTN 120 in area 1, and there are two active TN channels, f1, f2 (per FIG. 7B). There may be a total of five UEs (UE1 . . . UE5) to be serviced by the NTN. BWP Management 180 has assigned BWP1 as the active BWP and BWP2 as non-active for UE1, UE2, and UE3 in area 1. BWP Management has also assigned BWP2 as the active BWP and BWP1 as non-active for UE4 and UE5.

In the next state, 902, satellite 122 moves to cover NTN area 2. Two BWPs, including BWP1 and BWP2, are assigned to the NTN 120 in this area, and there are three active TN channels, f2, f3, f5 (per FIG. 7C). There may be a total of four UEs (UE6 . . . UE9) to be serviced by the NTN in area 2. BWP Management 180 has assigned BWP1 as the active BWP and BWP2 as non-active for UE6 and UE7 in area 2. BWP Management 180 has also assigned BWP2 as the active BWP and BWP1 as non-active for UE8 and UE9.

In the next state, 903, satellite 122 moves to cover NTN area 3. BWP1 and BWP2 are again assigned to the NTN 120 in this area, and there are two active TN channels, f3, f5 (per FIG. 7D). There may be a total of six UEs (UE10 . . . UE15) to be serviced by the NTN in area 3. BWP Management 180 has assigned BWP1 as the active BWP and BWP2 as non-active for UE10, UE11, and UE12. BWP Management 180 has also assigned BWP2 as the active BWP and BWP1 as non-active for UE13, UE14, and UE15.

In the next state, 904, satellite 122 moves to cover NTN area 4. BWP3 and BWP4 are assigned to the NTN 120 in this area 4, and there are three active TN channels, f3, f4, and f6 (per FIG. 8B). There may be a total of three UEs (UE16 . . . UE18) to be serviced by the NTN in area 4. BWP Management 180 has assigned BWP3 as the active BWP and BWP4 as non-active for UE16 and UE17. BWP Management 180 has also assigned BWP4 to be the active BWP and BWP3 as non-active for UE18.

In the next state, 905, satellite 122 moves to cover NTN area 5. BWP3 and BWP5 are assigned to the NTN 120 in this area, and there are three active TN channels, f3, f4, and f5 (per FIG. 8C). There may be a total of three UEs (UE19 . . . UE21) to be serviced by the NTN in area 5. BWP Management 180 has assigned BWP3 as the active BWP and BWP5 as non-active for UE19 and UE20. BWP Management 180 has also assigned BWP5 as the active BWP and BWP3 as the non-active for UE21.

In the next state, 906, satellite 122 moves to cover NTN area 6. Only BWP6 is assigned to the NTN 120 in this area, and there are two active TN channels, f4, and f6 (per FIG. 8D). There may be a total of six UEs (UE22 . . . UE27) to be serviced by the NTN in area 6. BWP Management 180 has assigned BWP6 as the active BWP for all six UE and has no BWPs available for the non-active list.

Figure 10:
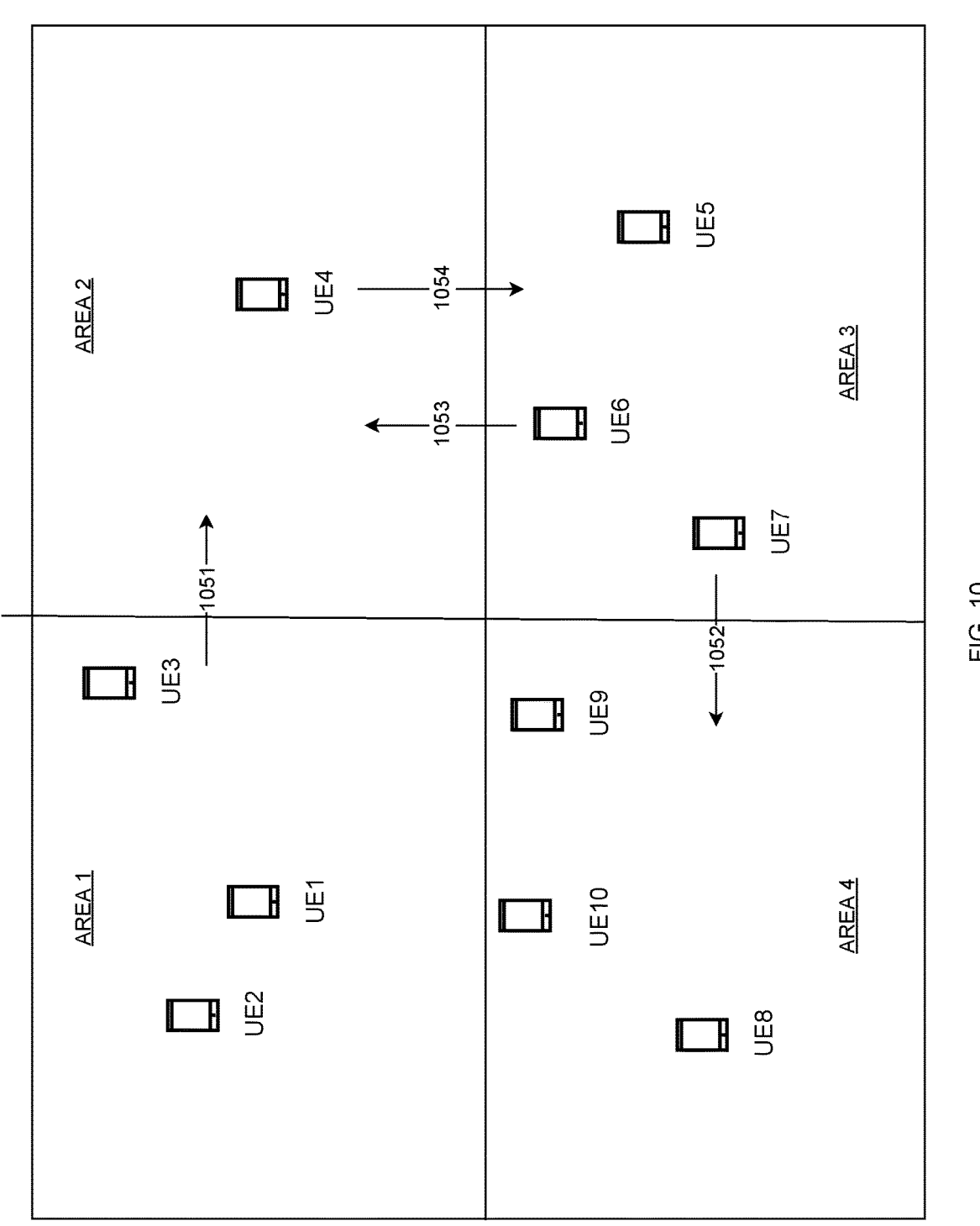
FIG. 10 illustrates the management of BWPs from the perspective of the UEs as they move from area to area.

FIG. 10 illustrates the management of BWPs from the perspective of the UEs as they move from area to area. As described in connection with FIG. 1, satellite 122 uses a beamforming antenna to service UEs in several adjacent areas. In this example, there are four areas labeled area 1, area 2, area 3, and area 4 (which do not necessarily correspond to the same "areas" discussed in connection with other figures such as FIG. 9.

In this example, UE1, UE2 and UE3 are presently located in area 1 1010, UE4 is located in area 2 1020, UE8, UE9 and UE10 are located in area 3 1030, and UE5, UE6 and UE7 are located in area 4 1040.

The table in FIG. 11 lists assignments of BWPs to areas. Area 1 1010 is assigned BWP1 and BWP2, area 2 is assigned BWP2 and BWP3, area 3 is assigned BWP1 and BWP4, and area 4 is assigned BWP5.

The table of FIG. 11 also shows the assignment of active and non-active BWPs to each of the ten UEs (UE1 . . . UE10). The assignments of active and non-active BWPs have been made to expedite the switching of BWPs as each of the UEs moves from one area to a neighboring area. In particular, BWP Management 180 attempts to assign the non-active BWPs to correspond to the active BWPs in neighboring areas where possible.

For example, when UE3 moves from area 1 to area 2 (indicated by arrow 1051 in FIG. 10), UE3 already had BWP2 as its active BWP. Thus BWP2 can remain active, and therefore no switching of BWPs is necessary. As discussed above in connection with FIG. 6, it may be necessary to effect an intra-frequency handover as it moves into area 2 so that UE3 operates with a different part of spectrum within BWP2.

However, consider when UE9 moves from area 3 to area 4, as indicated by arrow 1052. It will need to switch from active BWP1 to having BWP5 active. Since BWP5 is already in UE9's non-active list, this switching can occur rapidly using fast DCI messaging. In moving to an area with a different active BWP, as discussed in connection with FIG. 6, UE9 will also effect an inter-frequency handover to operate within a portion of the spectrum within BWP5.

When UE6 moves from area 3 to area 2, as indicated by arrow 1053, it needs only switch from active BWP5 to BWP2, and BWP2 is already in its non-active list.

However, if UE 4 moves from area 2 to area 3, it was using BWP3 with only BWP2 on its non-active list. Its active BWP will have to be reconfigured to BWP1 or BWP4 using the lengthier RRC messaging.

It can now be understood how the BWPs assigned for use by an NTN are selected from portions of the spectrum that do not overlap with active channel assignments for TNs in the same area. Different active BWPs are also assigned to neighboring coverage areas of the NTN. A list of non-active BWPs that includes at least one BWP that is active in a neighboring area is also maintained. This approach permits using fast DCI messaging to assign or switch BWPs when possible.

Further Implementation Options

It will be appreciated by those of skill in the art that various options are possible for implementing the functions and components described herein.

The UEs 170, satellite 122, gateway 124, and RANs 105, 125, respectively include one or more transceivers, which may be any type of device configured to transmit and/or receive radio frequency signals via one or more antennas. The transceivers may perform coding, decoding, modulation, and demodulation of data.

The UEs 170, satellite 122, gateway 124, RANs 105, 125, gNBs 106, 126, and cores 108, and 128 may also be implemented in whole or in part as data processors. These processors may be a controller, a microcontroller, a microprocessor, or a microcomputer and may be implemented by hardware, firmware, software, or their combination. Application-specific integrated circuits (ASICs), digital signal processors (DSPs), digital signal processing devices (DSPDs), programmable logic devices (PLDs), and field programmable gate arrays (FPGAs). These devices are configured to perform the techniques described herein.

In some instances, the data processors may be implemented in whole or in part by a physical or virtual, or cloud-based general-purpose computer having a central processor, memory, disk or other mass storage, communication interface(s), input/output (I/O) device(s), and other peripherals. The general-purpose computer is transformed into the processor and executes the processes described above, for example, by loading software instructions into the processor and then causing execution of the instructions to carry out the functions described.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read-only memory (ROM); random access memory (RAM); storage including magnetic disk storage media; optical storage media; flash memory devices; and others.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

This disclosure is also not limited by the name of each node described above, and in the case of a logical node or entity performing the above-described function, the configuration of this disclosure may be applied. In addition, the different logical nodes may be physically located in the same or different physical location as other logical nodes, and may be provided with a function by the same physical device (e.g., a processor, a controller, etc.) or by another physical device. As an example, the function of at least one logical node described herein may be provided through virtualization in one physical device.

The methods, systems, and devices discussed above should be considered to be examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional states or steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may then execute the program code to perform the described tasks.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

The above description has particularly shown and described example embodiments. However, it will be understood by those skilled in the art that various changes in form and details may be made therein without departing from the legal scope of this patent as encompassed by the appended claims.

The invention claimed is:

1. A method of operating a Non-Terrestrial Network (NTN) to cover two or more neighboring geographic areas, and where a Terrestrial Network (TN) is also operating in at least one of the neighboring geographic areas, the method comprising:

determining active channels in use by the TN;

determining a set of two or more candidate Bandwidth Parts (BWPs) for use by the NTN from areas of electromagnetic spectrum that are allocated for use by the NTN and which electromagnetic spectrum does not overlap with the active channels in use by the TN, the two or more candidate BWPs each specifying a contiguous set of frequencies and timeslots available for communication between the NTN and two or more User Equipments (UEs) operating within the two or more neighboring geographic areas;

assigning one of the set of candidate BWPs for use by the NTN as an active BWP for the UEs to communicate using the NTN in the first one of the neighboring geographic areas; and assigning one of the set of candidate BWPs for use by the UEs as an active BWP for the UEs to communicate using the NTN in a second one of the neighboring geographic areas.

2. The method of claim 1 additionally comprising:

assigning one or more of the candidate BWPs for use by the NTN as one or more non-active BWPs in the first one of the neighboring geographic areas, such that at least one of the non-active BWPs is the same as the active BWP assigned to the second one of the neighboring geographic areas.

3. The method of claim 2 additionally comprising:

detecting movement of a selected one of the UEs from the first geographic area to the second geographic area; and transmitting an instruction to the selected one of the UEs to switch its assigned active BWP using information from the non-active BWP via a Layer 1 Downlink Control Information (DCI) message or a higher layer Radio Resource Control (RRC) signaling.

4. The method of claim 1 wherein at least one of the active BWPs is further assigned to (a) maximize at least one of throughput, channel quality or signal strength of the NTN;

(b) minimize out of band interference between the TN and NTN, and/or (c) minimize intra-NTN-band handover interference when one of UEs moves from one geographic area to another geographic area.

5. The method of claim 1 wherein assigning one of the set of candidate BWPs for use as the active BWP for the UEs to communicate using the NTN in the first one of the neighboring geographic areas further comprises:

i. mapping two or more of the UEs to the one of the set of candidate BWPs having largest bandwidth; or ii. distributing two or more of the set of candidate BWPs to two or more of the UEs, based on the respective bandwidths of the two or more of the set of candidate BWPs.

6. The method of claim 1 additionally comprising:

determining when a selected UE is located near a border of the first one of the neighboring geographic areas, and then assigning the active BWPs of the second one of the neighboring areas to a non-active list of the selected UE.

7. The method of claim 2 additionally comprising:

determining when a selected UE is moving from the first neighboring geographic area to the second neighboring geographic area;

when the active BWPs of the first and second neighboring geographic areas are the same, then (a) not switching the selected UE to a new active BWP; and (b) effecting an intra-frequency handover such that the UE operates within a different portion of the active BWP; and otherwise (c) switching the selected UE to a new active BWP that corresponds to at least one of the non-active BWPs; and (d) effecting an inter-frequency handover such that the UE operates within a portion of the new active BWP.

8. The method of claim 1 additionally wherein the NTN is operated by a non-geostationary satellite that moves along a projected path from the first neighboring geographic area to the second neighboring geographic area, and the candidate BWPs are selected from parts of the electromagnetic spectrum that do not overlap with the active channels in use by the TN in either the first neighboring geographic area or the second neighboring geographic area.

9. The method of claim 1 wherein a coverage area of the NTN has a different shape or different dimension than a coverage area of the TN.

10. The method of claim 1 wherein the BWPs are assigned from a super-NTN spectrum that includes contiguous and/or non-contiguous parts of the electromagnetic spectrum allocated for both the TN and NTN in at least one of the neighboring geographic areas.

11. An apparatus for operating a Non-Terrestrial Network (NTN) to cover two or more neighboring geographic areas, and where a Terrestrial Network (TN) is also operating in at least one of the neighboring geographic areas, the apparatus comprising:

one or more data processors; and one or more computer readable media including instructions that, when executed by the one or more data processors, cause the one or more data processors to perform a process for:

determining active channels in use by the TN;

determining a set of two or more candidate Bandwidth Parts (BWPs) for use by the NTN from areas of electromagnetic spectrum that are allocated for use by the NTN and which electromagnetic spectrum does not overlap with the active channels in use by the TN, the two or more candidate BWPs each specifying a contiguous set of frequencies and timeslots available for communication between the NTN and two or more User Equipments (UEs) operating within the two or more neighboring geographic areas;

assigning one of the set of candidate BWPs for use by the NTN as an active BWP for the UEs to communicate using the NTN in a first one of the neighboring geographic areas; and assigning one of the set candidate BWPs for use by the UEs as an active BWP for the UEs to communicate using the NTN in a second one of the neighboring geographic areas.

12. The apparatus of claim 11 wherein the one or more data processors are further for:

assigning one or more of the candidate BWPs for use by the NTN as one or more non-active BWPs in the first one of the neighboring geographic areas, such that at least one of the non-active BWPs is the same as the active BWP assigned to the second one of the neighboring geographic areas.

13. The apparatus of claim 12 wherein the one or more data processors are further for:

detecting movement of a selected one of the UEs from the first geographic area to the second geographic area; and transmitting an instruction to the selected one of the UEs to switch its assigned active BWP using information from the non-active BWP via a Layer 1 Downlink Control Information (DCI) message or a higher layer Radio Resource Control (RRC) signaling.

14. The apparatus of claim 11 wherein at least one of the active BWPs is further assigned to (a) maximize at least one of throughput, channel quality or signal strength of the NTN;

(b) minimize out of band interference between the TN and NTN, and/or (c) minimize intra-NTN-band handover interference when one of UEs moves from one geographic area to another geographic area.

15. The apparatus of claim 11 wherein assigning one of the set of candidate BWPs for use as the active BWP for the UEs to communicate using the NTN in the first one of the neighboring geographic areas further comprises:

i. mapping two or more of the UEs to the one of the set of candidate BWPs having largest bandwidth; or ii. distributing two or more of the set of candidate BWPs to two or more of the UEs, based on the respective bandwidths of the two or more of the set of candidate BWPs.

16. The apparatus of claim 11 wherein the one or more data processors are further for:

determining when a selected UE is located near a border of the first one of the neighboring geographic areas, and then assigning the active BWPs of the second one of the neighboring areas to a non-active list of the selected UE.

17. The apparatus of claim 12 wherein the one or more data processors are further for:

determining when a selected UE is moving from the first neighboring geographic area to the second neighboring geographic area;

when the active BWPs of the first and second neighboring geographic areas are the same, then (a) not switching the selected UE to a new active BWP; and (b) effecting an intra-frequency handover such that the UE operates within a different portion of the active BWP; and otherwise (c) switching the selected UE to a new active BWP that corresponds to at least one of the non-active BWPs; and (d) effecting an inter-frequency handover such that the UE operates within a portion of the new active BWP.

18. The apparatus of claim 11 additionally wherein the NTN is operated by a non-geostationary satellite that moves along a projected path from the first neighboring geographic area to the second neighboring geographic area, and the candidate BWPs are selected from parts of the electromagnetic spectrum that do not overlap with the active channels in use by the TN in either the first neighboring geographic area or the second neighboring geographic area.

19. The apparatus of claim 11 wherein a coverage area of the NTN has a different shape or different dimension than a coverage area of the TN.

20. The apparatus of claim 11 wherein the BWPs are assigned from a super-NTN spectrum that includes contiguous and/or non-contiguous parts of the electromagnetic spectrum allocated for both the TN and NTN in the at least one of the neighboring geographic areas.

* * * * *